United States Patent

[11] 3,572,724

[72] Inventor Jacob Rabinow
Bethesda, Md.

[21] Appl. No. 755,598
[22] Filed Aug. 27, 1968
[45] Patented Mar. 30, 1971
[73] Assignee Max L. Libman
Reston, Va.
fractional part interest

[54] SERVODRIVEN SPRING-SUPPORTED ARM FOR PHONOGRAPH PICKUPS

11 Claims, 12 Drawing Figs.

[52] U.S. Cl. .................... 274/13, 274/23
[51] Int. Cl. .................... G11b 3/10
[50] Field of Search .................... 274/23, 13

[56] References Cited

UNITED STATES PATENTS

| | | | |
|---|---|---|---|
| 2,915,315 | 12/1959 | Rabinow | 274/23(.1) |
| 3,272,513 | 9/1966 | Jeles | 274/23(.1) |
| 3,416,807 | 12/1968 | Arent | 274/23 |

*Primary Examiner*—Harry N. Haroian
*Attorney*—Max L. Libman

ABSTRACT: Instead of the delicate pivoted bearing ordinarily used to support a phonograph arm, a crossed spring suspension is used which permits limited motion of the phonograph pickup in the horizontal and vertical planes, but restrains the arm and pickup against motion in the direction of the longitudinal axis of the arm or rotary (torque wise) motion about this axis.

INVENTOR

Jacob Rabinow

BY Max L. Libman

ATTORNEY

INVENTOR

Jacob Rabinow

BY Max L. Libman

ATTORNEY

PATENTED MAR 30 1971 3,572,724

INVENTOR

Jacob Rabinow

BY Max L. Libman

ATTORNEY

SERVODRIVEN SPRING-SUPPORTED ARM FOR PHONOGRAPH PICKUPS

BACKGROUND OF THE INVENTION

U.S. Pat. No. 2,915,315, Dec. 1, 1959, to J. Rabinow, describes a servodriven phonograph arm of the general type to which the present invention is directed; this phonograph arm is servodriven to maintain true tangency to the record at all times and to reduce certain loads on the cartridge such as friction of the carriage support and the stiffness of the connecting cables. The patented arm is mounted on a delicate bearing, and so arranged that upon deviation of the arm from true tangency by a very small amount, a servomechanism drives a carriage upon which the arm is supported so as to restore the condition of tangency. An ideal cartridge support should be as light as possible so as to add as little reflected mass as possible to the stylus mount, should move in a straight line, and should add negligible friction to the motion directly produced by the stylus. However, the patented arm itself, which supports the pickup cartridge, is mounted on conventional rotary bearings which must produce some friction, and even though the cable from the pickup to the amplifier is bent only by a very small angle necessary for servocontrol, nevertheless the cable does add stiffness and rigidity to the mount. Modern pickups can play with forces of considerably less than 1 gram, and the continuing tendency is to reduce this force, requiring less and less pressure on the record, and producing less and less force to move the mount.

The present invention contemplates the mounting of the cartridge on an arm which is in turn supported by cross spring suspension so that at very small angles the suspension can be said to have negligible friction; cable forces can be eliminated by using the same crossed wire spring suspensions to carry the signals from the pickup to the audio amplifier.

In accordance with a modification of the present invention, it is not necessary to mount the pickup on a rotary arm, that is, an arm which pivots about a single point; instead, a translating mount will be described having a very low inertia and arranged so that the pickup moves in a linear mode, i.e., it remains parallel to itself while following the record groove. In this modification, the arm as such is eliminated, and a crossed spring suspension serves, in effect, as the arm carrying the pickup.

Crossed spring suspensions are old in the art of mechanics and can only be used where the angle of motion is small because beyond a small angle the springiness of the suspension comes into play and the opposing forces of the springs become quite considerable. However, in a servodriven arm where the angle is always kept near zero, these spring forces can be readily kept to a minimum, as will be shown below. With well-cut phonograph records where the cartridge oscillates through a very small angle, that is, where the record is truly concentric, the servomechanism can be made fast enough to follow the cartridge so as to keep the angle to a value less than 1°. If the crossed spring suspension is made soft enough, the resulting suspension can be said to be essentially completely free of friction and the spring forces produced on the cartridge can be made to be a very small fraction of those produced by the stylus itself.

BRIEF DESCRIPTION OF THE DRAWINGS

The specific nature of the invention as well as other objects and advantages thereof will clearly appear from a description of a preferred embodiment as shown in the accompanying drawings, in which:

FIG. 1 shows an overall and highly simplified schematic diagram of one embodiment of the invention. It should be understood that only the essential elements pertaining to the present invention are shown, and conventional arrangements, such as means for stopping the record at the end of its run may be of any conventional or known type. Base member 2 is attached to the bed of the machine carrying the turntable on which is mounted record disc 5 which is being played. The base member may be a metal plate as shown in FIG. 3 having upturned edges 2a which form the track for the moving carriage 3 which is driven by a motor 4 having an integral gear train, the gear train being designed to drive the cable 7 at a suitable slow speed. Carriage 3 is attached to the cable 7 as shown at 3*a* by any suitable clamping means which may be manually operated to disconnect the carriage from the cable so that it can be slid back into its original starting position, or to any other desired intermediate position.

Figure 2:
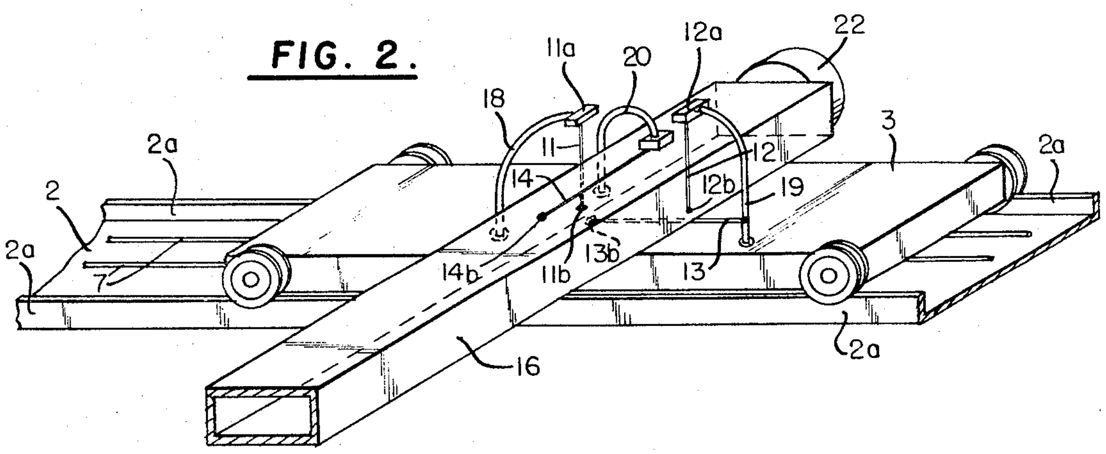
FIG. 2 is a perspective view of the carriage and part of the tone arm shown in FIG. 1.
Figure 4:
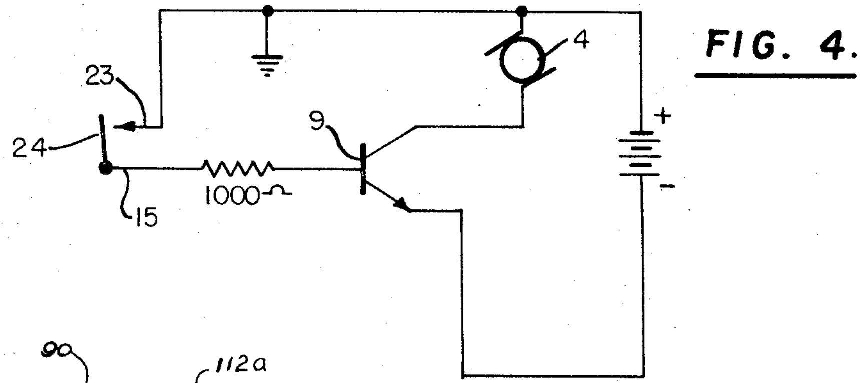
FIG. 4 is a schematic circuit diagram showing the servocontrolled circuit for maintaining arm tangency.

The motor 4 can be driven by an external power source, or preferably by a battery 8, and a transistor amplifier 9 is also mounted on the base member 2, the circuit arrangement being as shown in FIG. 4. The carriage is preferably supported by four wheels as shown, and mounted on the carriage are four cross wires 11, 12, 13, and 14 which support the phonograph arm 16. As best shown in FIG. 2, each wire is fastened so that one of its ends 11*b*, 12*b*, etc. is connected rigidly to the arm 16, while the other end is attached to a support 11*a*, 12*a*, etc., mounted on the carriage 3. It will thus be seen that these wires serving as spring elements, permit a limited amount of motion transverse to their length, but restrain the arm in the direction of their length; thus, wire 14 prevents the tone arm from being moved longitudinally in the direction of its axis, but permits it to move freely for a very limited distance transversely to the axis of the wire. In effect, the arm is thus restrained at a point corresponding to the intersection of the plane in which three of the wires are contained and the wire 14, providing a center of rotation for the tone arm near the rear end of the arm.

Figures 9A, 9B, 9C:
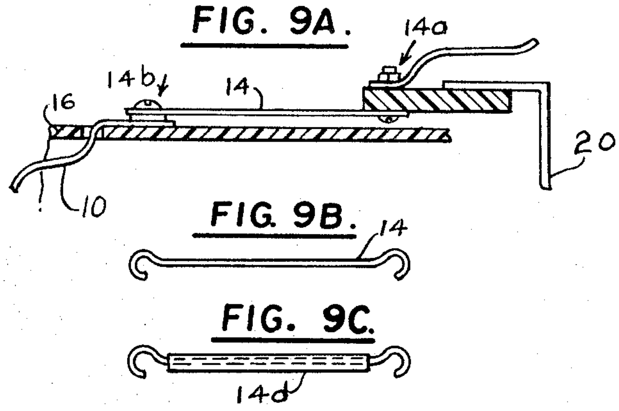
FIG. 9A is a detail sketch showing one manner in which the spring wires can also be used as electric leads.
FIG. 9B is a plan view of the wire shown in FIG. 9A.
FIG. 9C shows how such a wire can be coated to provide damping.

It is thus desired for the wires, or at least some of them, to also carry electric currents, i.e., the leads to the pickup and to the servocontrol circuit, and therefore the arm is preferably made of plastic or other insulating material, and the connection points of the spring wires, e.g., 14, can also serve as the terminals for electric wires as shown in FIG. 9A, where a lead 10 from the pickup is connected to terminal point 14*b* so that the current runs from this lead through the spring wire 14, and through connection point 14*a* to lead 15 which goes to the amplifier 9. The other leads may, of course, be similarly arranged, and it will be noticed that the only flexible leads required will be those leading from the carriage, such as lead 15, so that the force required to flex these leads is provided by the motor 4, and no strain from this is reflected in the mounting between the arm 15 and the carriage 3. The tone arm thus is affected only by the very small spring forces which appear in the spring wires 11—14, and the compliance of the spring wires is made such that the force exerted by them is relatively negligible. Other means of mounting the spring wires can, of course, be employed; for example, they could be soldered to lugs, permanently attached or embedded in the plastic of the arm and in pieces of insulation attached to the carriage. In fact, the whole carriage can be made of insulating material, if desired, thus eliminating separate insulating pieces.

The back end of the phonograph arm has molded into it a screw member 21 about which is threaded a counterweight 22, which can be thus adjusted to provide the correct playing force on the stylus of the cartridge.

The arm must be so mounted on the spring suspension that the pickup cartridge 17 can move up or down or right and left but not parallel to the direction of the arm as the record is played. The proper degrees of freedom are provided by the four wires 11—14, as best shown in FIG. 2. At right angles to the general direction of the phonograph arm are the two vertical wires 11 and 12, the bottom ends of which are fastened to the side of the arm at points **11*b* and 12*b* just above the bottom surface of the arm The upper ends of the wires 11 and 12 are attached to two insulating blocks 11*a* and 12*a* mounted on the ends of arms 18 and 19 respectively which are rigidly fastened to the carriage 3. These wires do not touch the sides of the arm but just clear them by a short distance, so that the wires permit the cartridge to move up and down at the end of the arm 16, but would also permit the arm to swing left and right and forward and back. In order to eliminate the fore and aft motion, that is, motion in the direction of the arm, spring wire 14 is provided, which restrains such motion, but which still permits the arm to swing from side-to-side as a whole. In order to eliminate the side-to-side swinging motion, a fourth wire 13 is provided, which passes just under the arm and has its left end (FIG. 1) connected rigidly to the arm at a point 13*b* which is just at the corner of the structure and is near the point to which the vertical wire 11 is connected to the arm point 11*b***. Now the arm is completely controlled and can move only in the desired mode, that is, the pickup can move left and right and up and down but it cannot go forward and back and it cannot swing right and left with the arm as a whole. The four spring wires can also function as four leads for bringing out the stereo signals and also for controlling the servomotor described above.

The spring wires may be in the order of from ten to twenty-five one-thousandths of an inch thick, and may be made of steel, beryllium copper, or other suitable material, and of such compliance that the arm 16 as a whole, in the order of 6—8 inches long with an ordinary cartridge mounted on the front can have a very low frequency of oscillation, in the order of 1 or 2 c.p.s., that is, the compliance of the arm can be much higher than that of the stylus itself. In modern pickups the resonance of the head against its stylus is usually in the order of 10—15 c.p.s.

Figure 1:
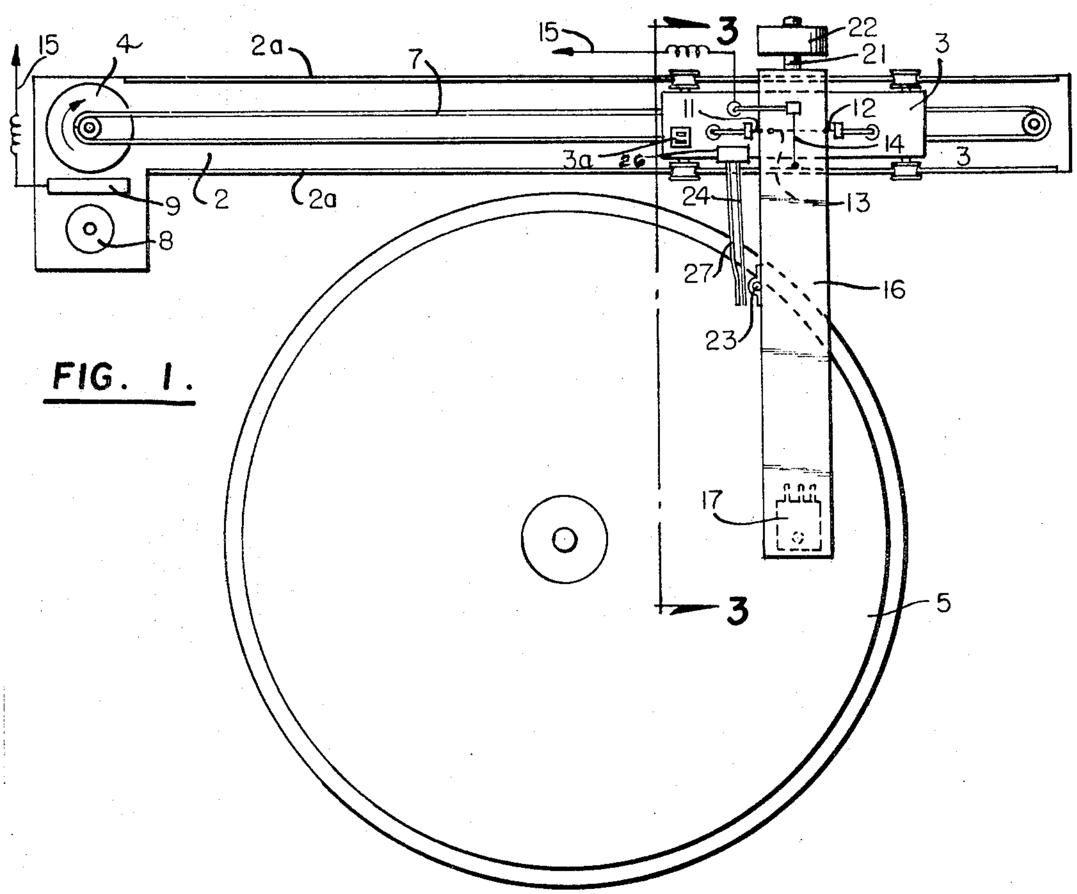
FIG. 1 is a schematic plan view of a preferred embodiment of the invention.
Figure 3:
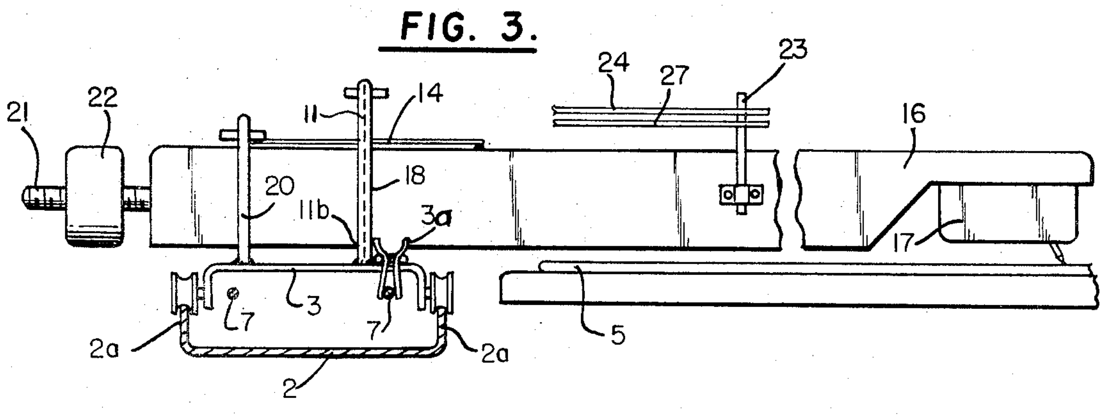
FIG. 3 is a side view of the modification shown in FIG. 1.

Means are provided to detect the position of the arm so as to control the servomechanism which drives the carriage supporting the arm. For this purpose, contact 23 is mounted rigidly on the arm 16 and may consist simply of a vertical wire as best shown in FIG. 3. It can be connected to one of the four cross springs described previously or may be connected in common with other grounds since a ground contact is all that is needed to operate the servo as will be shown below. Mounted very closely to this vertical contact 23 is a very soft spring contact 24 mounted on insulating block 26 which is in turn mounted rigidly to the carriage 3. Contacts 23 and 24 operate the transistor amplifier 9 which drives the motor 4. When the arm is in the rectangular position shown in FIG. 1, this contact is just barely open. As the stylus plays the record, it is moved to the left as seen in FIG. 1, until the contact wire 23 touches the spring contact 24, which starts the motor 4 running in the direction shown by the arrow, and thus moves the entire carriage to the left to restore the original angular position of the arm, which in turn causes separation of contacts 23 and 24. This motion is continuously repeated during the playing of the record, and consists of short slow motions of the carriage as it follows the cartridge playing across the record. It should be understood that the cartridge does not move in a perfectly continuous smooth motion when playing a conventional record, because the conventional cartridge is always oscillating slightly left and right even when playing the best records due to small eccentricities of the center hole and warpage of the record, so that the contact is continuously making and breaking, producing an almost continuous motion of the motor. In any case, the sensitivity of the amplifier is great enough and the carriage moves in such small steps so that the angle between true tangency of the arm and the actual angle is so small as to be insignificant.

A second contact 27 is shown in FIG. 1 immediately adjacent but slightly further away from the vertical contact 23, and this goes into action when the cartridge reaches the runoff groove of the record, which is sufficiently eccentric so that when the cartridge reaches this groove, the motion of the cartridge of the left is too fast for the servomechanism to follow, since the servomechanism is deliberately designed to produce a very slow motion of the cartridge to the left. When the runoff groove is reached, the contact 23 touches the second wire contact 24, which operates a second circuit and lifts the arm. The detailed mechanism for doing this may be similar to that shown in U.S. Pat. No. 2,915,315, and need not be described here in detail. For example, a finger 31 (FIG. 5) driven by another motor or by a solenoid 32 may be arranged to be just above the arm and just behind the suspension and so arranged that when the second contact 27 is energized, this solenoid draws the finger downward and lifts the arm from the record. At the same time, the turntable driving motor may also be stopped.

FIG. 3 shows a side view of the arm including the wire spring 14 which prevents longitudinal motion of the pickup and the vertical wire 11 which supports the weight of the pickup, together with wire 12, and permits it to move up and down.

The wire contact 23, particularly, is made very thin and very light. A gold or platinum alloy wire about 5 mils thick and about 1 inch long is entirely suitable for this function and provides so little force when it is just contacted as not to be detectable by the cartridge. During the runoff, the contact 23 is deflected by an appreciable amount, but in this situation, the music is no longer being played and the side pressure on the cartridge can be tolerated. This side pressure actually has a beneficial effect because it wipes the contacts once per record which is desirable because of the accumulated dust and dirt film which forms on electrical contact. It is also preferably to put the contacts 24, 27 at a slight angle to the main axis of the arm so that as the contacts rub on the thin wire during the runoff groove cycle, the contact is wiped first in one direction and then in the other so as to wipe the area clean for its normal servo operation.

Instead of using wires for the crossed spring suspension, other suitable flexible elements can be employed, such as ribbon or flat spring elements. For example, the springs 11 and 12 can be replaced by a single flat spring mounted in the plane of these springs, and a hole in this flat spring can be provided to permit the passage of wire 14. Narrow ribbons can replace wires 11 and 12 and a spirally twisted narrow spring ribbon can replace wire 14. The important consideration is to use spring members having flexibility in the desired direction and rigidity in at least one direction at right angles to said desired direction.

Figures 5, 6, 7:
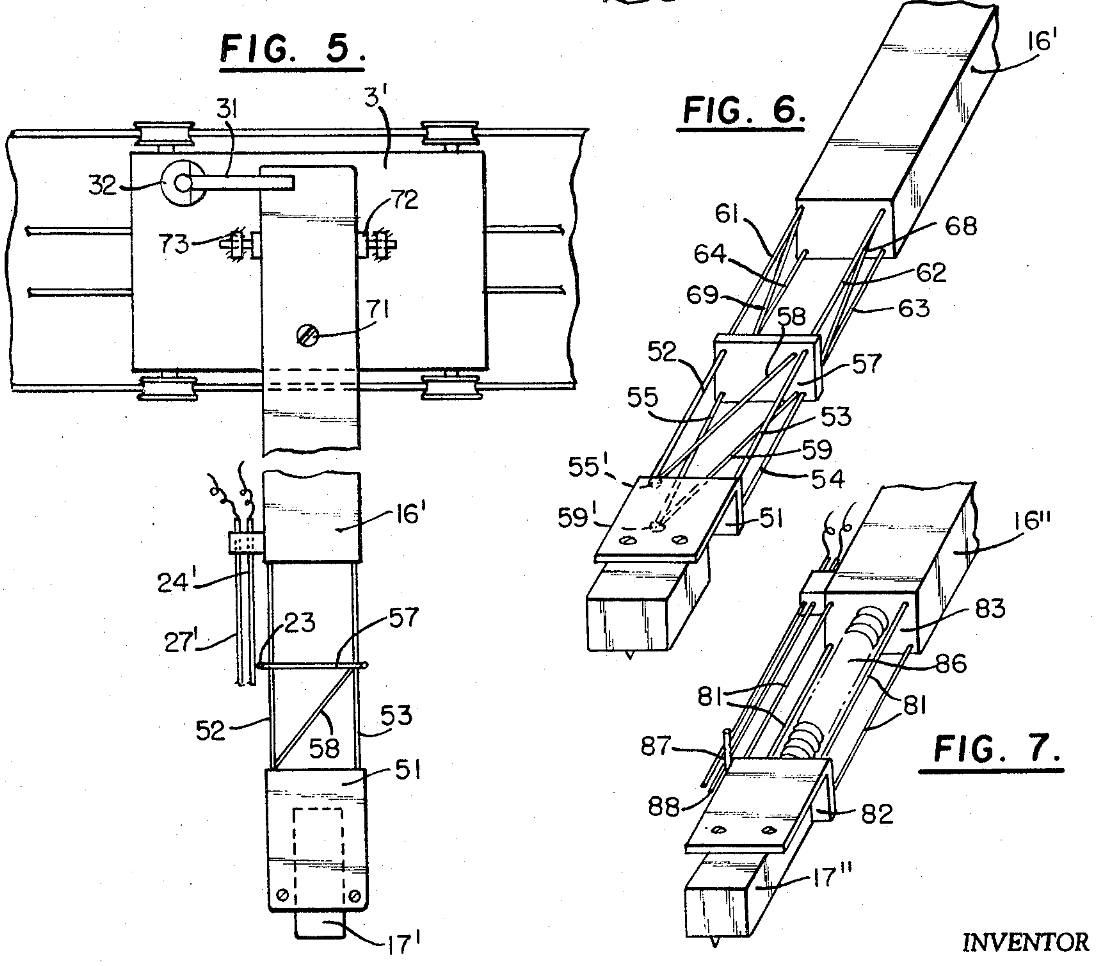
FIG. 5 is a plan view showing a carriage and tone arm of a modified form of the invention providing for translatory motion of the pickup.
FIG. 6 is a perspective view of a portion of the tone arm and pickup of FIG. 5.
FIG. 7 is a perspective view of a further modification of the invention.

In the embodiment of my servo arm shown so far and in the patent cited, the pickup is mounted so as to move with the arm which in turn moves in an angular relationship relative to its base or carriage. It may be advantageous in some cases to mount the pickup so that instead of being mounted on a rotating arm, the pickup itself is made to move in a purely translational mode, that is, it can move left and right so as to follow the record, or up and down so as to follow the vertical eccentricities but not to move along the groove. The servomechanism can then be designed to follow the left and right motion, disregard the up-and-down motion, and move the carriage so as to follow the pickup. A cross wire suspension accomplishing this is shown in FIGS. 5 and 6. FIG. 6 illustrates one of many possible crossed wire suspensions where the pickup cartridge is connected to a servodriven arm 16′ in such a manner as to satisfy the above requirements. In FIGS. 5 and 6, the cartridge is mounted on an angular plate member 51 which can be of insulating material, for example, to accomplish some of the other aims stated earlier in this patent application. To this member are connected six springs, four of the springs 52, 53, 54, 55, are parallel and provide the basic mounting permitting the plate 51 and the cartridge mounted on it to move in a plane parallel to that of the plane of the intermediate plate 57. In order to prevent the pickup from rotating but at the same time to permit it to move up and down, two diagonal wires 58 and 59 are added, as shown in top view of FIG. 5, and in perspective view in FIG. 6. It will be seen, then, that when the intermediate plate 57 is held fixed, the pickup can move up and down but not left and right because of the diagonal wires 58 and 59. It also cannot rotate because of the same wires. Perhaps its motion can be best understood by noting the points 55′ and 59′ are constrained to move up and down only, provided that the intermediate plate 57 is held still.

The intermediate plate 57 itself is connected by six similar wires to a structure 16′ which is attached to the carriage. Four wires 61, 62, 63 and 64 permit it to move in a plane parallel to itself. However, if it were not for the two diagonal wires 68, 69, the intermediate plate could also move up and down and rotate. By adding these two diagonal stiffening wires 68 and 69, the intermediate plate is now constrained so that it can only move left and right but not up and down and it cannot rotate. Now it will be seen that the cartridge as a whole can move left and right because the intermediate plate 57 can do so, and can move up and down because its suspension permits it to move up and down relative to this plate. Thus, by using a two-stage suspension, the desired result is obtained, namely, the cartridge has freedom to move up and down and left and right, but not in the direction of the groove or the line tangent to the groove.

The arm 16′ is rigidly connected to the servodriven carriage 3′ shown in FIG. 5, which corresponds to carriage 3 of FIG. 1; however, arm 16′ is adjustable in the up-and-down direction by screw 71 so as to set the desired vertical force on the cartridge. This is done by having the arm hinged at points 72, 73 to the carriage 3′ and providing a vertical screw 71 which can lift or lower the arm so as to set its initial condition. It should be noted particularly that this arm is not free to swivel left and right, or for that matter in any other direction during the playing of the record as was the case in the prior two embodiments. In fact, by adjustably moving the whole structure of the servomechanism up and down, this arm could be made integral with the servo carriage 3′. As in the previous embodiments, the attachment of the wires can be made to metal eyelets mounted on insulating plates, or they can be insulated in any other way so as to serve as leads for the signal circuits. It should be understood that the systems shown in this application should include shielding as necessary for the audio circuits in order to avoid problems of noise, pickup and hum, and that proper overall shielded framework will be provided in practice over the leads as necessary, this being common practice in the art.

Servo contact wires 23′, 24′ and 27′, similar to 23, 24 and 27 of FIG. 1 may be suitable mounted between the arm 16′ and plate 57 to control the followup motion of the carriage and the cartridge-lifting motion at the end of the record play, as in FIG. 1.

FIG. 7 shows another method of mounting the pickup 17″ so that it can be free to move up and down and left and right relative to its framework member 16″, but is not permitted to rotate or to move longitudinally. The suspension consists of four horizontal spring wires 81 connected between the bracket 82 carrying the cartridge and the back member constituting the main structural support, 16″. Four wires alone would not be sufficient to limit torsional displacements which are undesirable, and therefore a very soft metal bellows 86 normally called a Sylphon bellows is used. One end of the bellows is fastened, by cement for example, to the plate 83 of the arm structure 16″ while the front end of the bellows is cemented to the bracket 82. The bellows permit the bracket to move left and right and up and down, but prevent the bracket from turning with respect to member 83. Such bellows can be obtained today in many stiffnesses and thicknesses, and for the present application a very light and thin bellows will be used. It should be noted that with a good servomechanism the arm would follow the cartridge very closely and the deflection of the wires 81 and the bellows would be very small under normal operating conditions. The servo contact in this case would not be on an intermediate member as shown above, but would be connected to the left vertical side of the bracket 82 as shown at 87, and this contact member would engage spring element 88 for servocontrol similar to that described above. Thus the motion of the cartridge to the left would operate the contacts 87, 88 and drive the arm to follow the motion of the cartridge.

Figure 8:
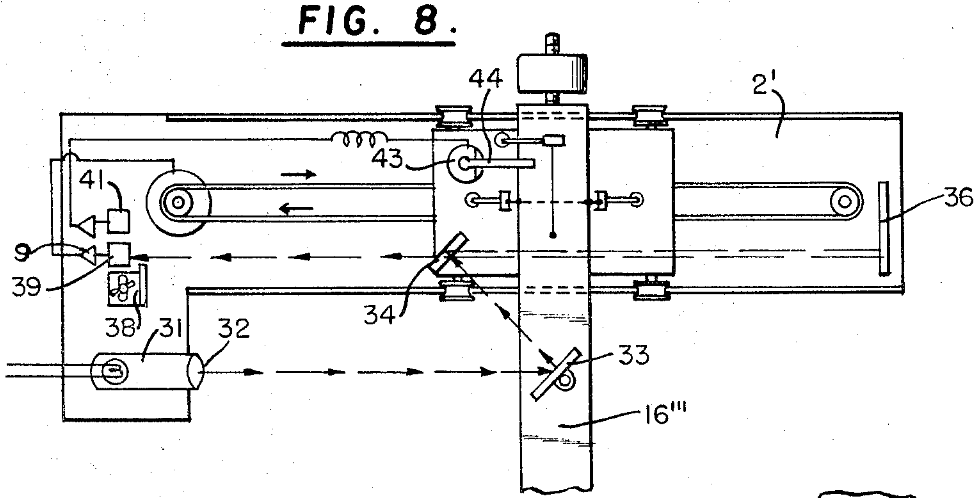
FIG. 8 is a view similar to FIG. 1 of a modification of the invention employing a light beam instead of switching contacts.

If it is desired to eliminate the contacts completely and drive the servomechanism entirely without contacts, so as to eliminate the contact forces required, this can be accomplished by using an optical system such as shown in FIG. 8. Here an optical servocontrol is employed using a light beam to control the motion of the carriage. The suspension of the arm 16‴ is assumed to be the same as that of arm 16 of FIG. 1, that is, it is supported by four wires as described. The construction of the arm itself is the same except that the servo and trip contacts have been eliminated. Instead the following optical system is used: Mounted rigidly on the carriage is a light beam projector consisting of a small lamp bulb 31 with its filament mounted in the vertical plane. In front of the bulb is a lens 32 which images this filament through a series of three mirrors 33, 34, 36 onto either a fixed shutter blade or onto one of two photocells 39 and 41. The light path is as follows: The light leaves the lens and impinges upon the mirror 33 mounted at a suitable angle on the arm 16‴. It is assumed that the whole light path system is above the arm so as not to be interrupted by any of the other components of the system. After leaving the mirror 33 on the arm, the light impinges on the mirror 34 mounted again at a suitable angle on the carriage 3′. This mirror is rigidly attached to the carriage. The light then goes to the right and impinges upon a fixed mirror 36 on the base member 2′. The light then reflects from this mirror and returns above the mirror 34 on the carriage, and finally falls either on the fixed shutter blade 38 or upon the photocell 39 or 41. By tilting the path of the light vertically it can be made to go across the top of the mirror 34, or else mirror 34 can be made of the semitransparent type so as to act both as a reflector for the beam and permit the light from the mirror to come back through it. When the arm is in the exactly correct 90° relationship with the carriage, that is, when it is exactly tangent with the record, the image of the filament of lamp 31 falls just on the edge of the fixed plate 38 and the servo is standing still. As the pickup moves to the left, mirror 33 changes its angle with respect to the optical path and the beam of light is deflected slightly clockwise. Thus the image of the filament now shifts from the edge of the fixed plate 38 and begins to fall on the photocell 39. The current in the photocell rises; this current rise is amplified by the transistor amplifier 9 and begins to drive the motor, which in turn drives the cables in the direction shown by the arrows so that the front cable moves to the left, carrying with it the carriage which is clamped to it. This corrects the angle of the mirror 33 and the beam of light moves counterclockwise away from the photocell and the servomechanism stops. In practice, the light will be continuously oscillated as described above so as to be sometimes on the photocell and sometimes off, or partially on the photocell, or if the record were perfect, partially on the photocell at all times. This means that the motor would move slowly since its speed is proportional to the voltage applied and the pickup would follow the record. In practice, whether the motor moves in small increments or continuously at slow speed, or both, is immaterial as long as the servo error is small and the record is followed with the arm being close to tangency.

To calibrate or initially set the mechanism several expedients can be used. The photocells 39 and 41 and the shutter 38 can be movable, in fact if the shutter is mounted on a slotted base as shown, it can be moved left and right, that is, along the slot so as to adjust the point at which the servo operates. The mirror 33 can also be mounted on a swivel base with a screw holding it in place so that it can be set for the correct angle. The other mirrors can be similarly mounted so as to be adjustable, as can the photocell. The gain of the amplifiers should be made adjustable to produce the correct servo action, as is well known in the art. When the stylus reaches the runoff groove, the angle changes more violently, as described above. The servomechanism is deliberately designed not to follow the arm at this speed and the light will swing further clockwise so as to impinge on the second photocell 41. When this photocell is actuated, its amplifier is energized, operating either a small motor or a solenoid 43 which moves a finger 44 downward, which is normally not in contact with the arm, and this finger, pressing down, lifts the cartridge. Other lift mechanism can be designed, such as the spring release mechanism shown in the above-cited patent, and the second photocell can energize the trip of such a spring release.

While in all of the embodiments discussed in this application servomechanisms are shown which follow only the lateral displacement of the pickup, that is the displacement parallel to the radius of the phonograph record, it should be understood that one can design a servomechanism to follow and up-and-down motions as well. This is not normally required, because the up-and-down motions of a well-designed turntable and of records in good condition are very small, and the normal free mounting of the cartridge permits this to occur without servo function. However, if desired, a separate servosystem can be arranged to follow the up-and-down motion also. The servomechanism can also be designed to follow both the left and right motions of the pickup, but ordinarily this is not necessary, and a single direction servo is not only simpler but has the great advantage of not going into oscillations even if the gain is very high, because if the motor overdrives slightly, the carriage merely waits until the arm catches up with it.

It is sometimes desirable to dampen the suspension of a phonograph arm so as to reduce the oscillations that can be induced between the cartridge and its stylus. In present-day pickups the stylus mounting usually includes some damping means, but if it is desired to add to this damping, a simple means of accomplishing this is shown. FIG. 9C shows one manner of mounting one of the spring wires, for example, spring 14. The spring itself, as can be seen in FIG. 9B, is simply a wire bent at its ends so that it can be conveniently fastened to terminal posts at **14*a* and 14*b*, as shown in FIG. 1. If it is desired to dampen the wire, it can be coated with a suitable damping material as shown at 14*d* in FIG. 9C**. Many such rubberlike materials are available today and are used to coat panels to deaden vibration and absorb sound. The damping material can be applied to a wire during its manufacture and simply pulled off at the anchorage points or it can be applied to each piece of wire later. The amount can be different at the different wires to provide different amounts of damping in the vertical direction and in the horizontal direction.

Figure 10:
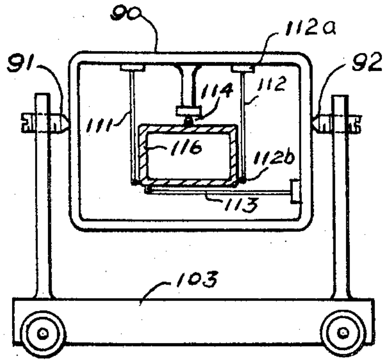
FIG. 10 is a schematic sectional view of a tone arm employing a combined spring and horizontal gimbal mounting.

In FIG. 10, the reference characters above 100 correspond to those of FIGS. 1 and 2 with 100 added.

FIG. 10 shows a modification employing a gimbal 90 mounted in horizontal bearings 91, 92 on base 103 which is part of the carriage (e.g., 3 in FIG. 1). The gimbal supports the arm 116 through spring members 111—114, corresponding exactly to members 11—14 of the preceding FIGS. The gimbal thus is capable of large vertical swings of the cartridge, such as those necessary to take care of a thick record stack, while the small motions are taken care of by the springs as before.

I claim:

1. In a servodriven supporting structure for a phonograph cartridge:

a. means to mount said cartridge on a servodriven support means, said mounting means consisting solely of spring elements so arranged that the cartridge can have displacement against spring compliance in the lateral and vertical directions relative to said supporting structure; and b. a servomechanism for driving said supporting structure and means to detect at least one of such displacements for operating the servomechanism to drive the supporting structure so as to follow the motion of the cartridge.

2. A support for a phonograph-playing cartridge comprising:

a. a carriage arranged to travel along a guide structure in a path parallel to the desired path of motion of the cartridge when playing a disc record on a turntable;

b. mounting means supporting said cartridge on said carriage, said mounting means consisting solely of a plurality of spring members each fixed at one end to the carriage and at the other end supporting the cartridge, each of said spring members having substantially no compliance in one direction and having a high compliance at right angles to said one direction;

c. said spring members being arranged to permit limited motion of the cartridge in a plane perpendicular and in a plane parallel to the turntable, but completely restraining the cartridge against motion in a direction tangent to the arc of the record groove being played; and d. detector means to detect a deviation of the cartridge with respect to the carriage due to said limited motion of the cartridge in the direction of travel of the carriage as a record is being played, and servo means controlled by said detector means for driving said carriage along said guide structure to follow the motion of the cartridge as it plays a record.

3. The invention according to claim 2, at least some of said spring members being electrically insulated from each other and arranged to serve as electrical conductors between the cartridge and the carriage.

4. The invention according to claim 3, said electrical conductors serving to respectively conduct playing signals from the cartridge to the carriage, and also to conduct control signals for the servomechanism.

5. The invention according to claim 2, said spring elements being so arranged as to permit limited lateral displacement of the cartridge in a direction parallel to itself as the cartridge stylus follows the groove of a record being played, while restraining any rotation of the cartridge about a vertical or horizontal axis.

6. The invention according to claim 2, said spring elements including a Sylphon bellows fixed at one end relative to the cartridge and at the other end relative to the carriage, to prevent relative rotation between the cartridge and the carriage.

7. The invention according to claim 2, and damping means affixed to at least some of said spring members to dampen the motion of said cartridge.

8. A support for a phonograph playing cartridge comprising:

a. a guide structure and a carriage arranged to travel along said guide structure in a path parallel to the desired path of motion of the cartridge when playing a record on a turntable;

b. mounting means supporting said cartridge on said carriage, said mounting means consisting solely of spring elements, said spring elements being so arranged as to permit only small lateral and vertical displacements of the cartridge relative to the carriage;

c. said mounting means being so arranged as to keep the cartridge parallel to itself as it moves laterally with respect to the carriage in playing a record;

d. detector means to detect a deviation of the cartridge from a determined position with respect to the carriage; and e. servo means controlled by aid detector means for driving said carriage along said guide structure to follow the motion of the cartridge as it plays the record.

9. The invention according to claim 8, said mounting means being so arranged as to also keep the cartridge parallel to itself as it moves vertically with respect to the carriage in playing a warped record.

10. A servodriven supporting structure for a phonograph cartridge comprising:

a. a base member, and a guide structure mounted thereon;

b. a carriage arranged to travel along said guide structure in a path parallel to a desired direction of motion of said cartridge as a record is being played;

c. mounting means supporting said cartridge on said carriage arranged to permit a limited amount of motion of the cartridge with respect to the carriage in said desired direction;

d. detector means to detect a deviation of the cartridge with respect to the carriage due to said limited motion of the cartridge in the direction of travel of the carriage as a record is being played, and servo means controlled by said detector means for driving said carriage along said guide structure to follow the motion of the cartridge as it plays a record;

e. said servo means comprising a light source mounted on said base;

f. first light reflector means fixed to said mounting means and second light reflector means mounted on said carriage;

g. said first reflector means being positioned to reflect light from said light source toward said second reflector means; and h. photosensitive means mounted on said base and responsive to light reflected from said second reflector means to control said servo means for driving said carriage along said guide structure to follow the motion of said cartridge as it plays a record.

11. The invention according to claim 10, including:

a. means for lifting the cartridge from a record being played; and b. said photosensitive control means being also arranged to control said last means to lift the cartridge from the record when the speed of the servomechanism is exceeded.